United States Patent [19]
Bohmer et al.

[11] Patent Number: 5,182,957
[45] Date of Patent: Feb. 2, 1993

[54] DRIVE UNIT, IN PARTICULAR FOR A WINDSHIELD WIPER SYSTEM ON A MOTOR VEHICLE

[75] Inventors: Rainer Bohmer, Brackenheim-Meimsheim; Rainer Bruhn, Karlsruhe; Hans-Peter Rienhardt, Neckarsulm; Bernd Walther, Bietigheim-Bissingen, all of Fed. Rep. of Germany

[73] Assignee: SWF Auto-Electric GmbH, Fed. Rep. of Germany

[21] Appl. No.: 659,319

[22] Filed: Mar. 18, 1991

[30] Foreign Application Priority Data
Jun. 24, 1989 [DE] Fed. Rep. of Germany ....... 3920731

[51] Int. Cl.⁵ .................... F16H 21/40; G05G 5/04; B60S 1/08
[52] U.S. Cl. ...................... 74/42; 74/526; 15/250.3
[58] Field of Search ................ 74/42, 43, 526; 15/250.13, 250.16, 250.21, 250.3

[56] References Cited
U.S. PATENT DOCUMENTS

| | | | |
|---|---|---|---|
| 2,744,282 | 5/1956 | Dyer et al. | 15/250.3 |
| 3,768,325 | 10/1973 | Kucharski, Jr. | 74/405 |
| 4,645,042 | 2/1987 | Inoue et al. | 74/526 X |

FOREIGN PATENT DOCUMENTS

| | | |
|---|---|---|
| EP0316831 | 11/1988 | European Pat. Off. . |
| 1060276 | 7/1957 | Fed. Rep. of Germany ... 15/250.13 |
| 3514199 | 10/1986 | Fed. Rep. of Germany . |
| 3740312 | 6/1989 | Fed. Rep. of Germany ... 15/250.16 |
| 0843937 | 8/1960 | United Kingdom . |

*Primary Examiner*—Allan D. Herrmann
*Attorney, Agent, or Firm*—Robert P. Seitter; J. Gordon Lewis

[57] ABSTRACT

The present invention relates to a drive unit, in particular for a windshield wiper system on a motor vehicle, comprising a drive motor, a gearing accommodated in a gear housing and following the drive motor, which gearing has an output shaft driven in pendulum fashion and a pinion seated on it in a manner protected against twisting as well as including a stop member for limiting the pendulum angle of the output shaft. The stop member is either swivellable with the pinion or firmly arranged on the output shaft. In order to obtain a good guidance and a reliable hold of the stop member it is pushed upon the output shaft by means of a ring-shaped portion. In particular the ring-shaped portion can simultaneously serve as a buffer disc for the pinon, so that in comparison with a known drive unit, piece parts can be saved.

19 Claims, 5 Drawing Sheets

DRIVE UNIT, IN PARTICULAR FOR A WINDSHIELD WIPER SYSTEM ON A MOTOR VEHICLE

INTRODUCTION

The present invention starts from a drive unit, which is in particular used for a windshield wiper system on a motor vehicle.

BACKGROUND OF THE INVENTION

The output shaft of some drive units is intended to occupy an exactly defined rest position within a particular range of tolerances. This is for example also applicable to windshield wiper systems in which the wiper blade is to be parked as closely to the rim of the windshield as possible. As far as wiper blades are concerned which are driven by an electric motor, in a customary way the electric motor is braked by short circuit, when the wiper blades enter the rest position. This electric-dynamic brake does not always effect a satisfactory rest position. This rest position is rather also considerably dependent on the battery voltage and/or on the condition of the windshield. The play between the individual gear members nearly always existing contributes also to the fact that the desired rest position is not always occupied. The gearing play has effects as well that during operation the reversing positions of the wiper blade are not exactly maintained.

In a windshield wiper system known from the laid open German printed specification 3 514 199 it has been attempted to solve the above mentioned problem by limiting the pendulum angle of the output shaft by a stop on the pinion connected with the output shaft in a manner protected against twisting and by a counterstop fixed on the housing in any direction of rotation. The pinion thereby has a tooth gap and the two teeth adjacent to the gap co-operate with the counterstops by means of a linearly displaceable pressure-transmitter.

From the German laid open printed specification 3 740 312 a windshield wiper system is also known in which the pendulum angle of the output shaft is to be limited by stops for the pinion. In this windshield wiper system a pin is pressed into a bore of the pinion which pin protrudes axially over one side of the pinion, runs to and fro in a groove of the gear housing and in the reversing positions of the wiper blade abuts on rubber segments inserted into the groove of the gear housing. The pin can be designated stop member, by which the pendulum angle of the output shaft is limited.

BRIEF DESCRIPTION OF THE INVENTION

The invention is based on the problem of developing a drive unit in such a way that the stop member can be reliably accommodated in the gear housing in the desired position.

This problem is solved according to the invention by a drive unit which is equipped with the feature that the stop member is pushed onto the output shaft by means of a ring-shaped portion. In a drive unit according to the invention thus the stop member is formed in such a way that the output shaft can also be used to secure the position of the stop member. A bore in the pinion, for which up to now an additional work step has been necessary, is no longer needed. If the stop member is swivellable about the axis of the output shaft by the pinion the stop member is well guided by the ring-shaped portion surrounding the output shaft.

In a drive unit of the kind looked at, the pinion is by means of one or two buffer discs customarily supported axially on the bottom and/or on the cover of the gear housing. Advantageously the ring-shaped portion of the stop member is used as a buffer disc, so that the number of piece parts can be reduced.

In particular in drive units for windshield wiper systems on motor vehicles, the output shaft comes out of the gear housing on one side of the pinion and at the other side of the pinion it has an end which protrudes over the pinion, however is located within the housing. In the preferred embodiment the ring-shaped portion of the stop member is pushed upon the protruding end of the output shaft. Then the assembly is especially simple. In addition the ring-shaped portion of the stop member can also be closed above the end of the output shaft, so that even if the output shaft is axially moved relative to the pinion by extraordinary axial forces, the output shaft will be prevented from directly abutting on the gear housing, in particular on the gear housing cover.

Because of space conditions it may be unfavourable to arrange the ring-shaped portion of the stop member on the end of the output shaft. The ring-shaped portion can then be positioned on that side of the pinion on which the output shaft comes out of the gear housing. If the stop member is swivellable together with the pinion, it co-operates with counterstops fixed to the housing, which counterstops are mostly positioned in the gear housing on the side of the pinion, on which the output shaft comes out of the gear housing. If the ring-shaped portion of the stop member is also positioned on this side of the pinion, a stop with which the stop member co-operates with the counterstops fixed on the housing and a carrier with which the stop member engages in a recess of the pinion, can be positioned on opposite sides of the ring-shaped portion. Even if stop and carrier are voluntarily set off in the circumferential direction of the ring-shaped portion it is possible to remove the stop member from the mold axially.

In order not to damage the stops during operation either the counterstops fixed to the housing or the stop on the stop member ought to be formed elastically flexible. In particular up to now a flexible rubber material has been used for the stops fixed to the housing. In order to ensure that huge forces attacking from outside and attempting to turn the output shaft do not overly press together the rubber material and damage parts of the gearing, it is provided that the stop member includes a second stop co-operating with at least one rigid stop fixed to the housing and that the spacing between the first stop and the flexible counterstop is smaller than that between the second stop and the rigid counterstop. In this manner it is achieved that, during normal operation of the drive unit, the first stop abuts on the flexible counterstops. In an attempted turning of the output shaft from outside, when the elastic stop has given way a bit, the second stop abuts on the rigid counterstop and thereby prevents the output shaft from being turned further, so that the material of the elastic stop is not subject to wear and a damaging of gearing members is avoided.

When the pendulum angle of the output shaft is small it may suffice, if a toothed segment is used as a pinion the outermost teeth of which directly co-operated with elastically flexible counterstops fixed to the housing. In this case the counterstops fixed to the housing can be formed on a stop member having a firm seat in the gear housing. The elastically flexible counterstops fixed to the housing are preferably obtained in that the ring-shaped portion of the stop member pushed upon the output shaft is made in one piece with at least one elastically flexible arm. In order to prevent the elastically flexible arm from being overly stretched, it is followed by a rigid stop on which the arm abuts after a particular travel.

It is known to axially support a crank wheel included in the gearing of a drive unit by means of a ring outside the crank radius. The ring and the stop are made in one piece from plastic material, so that only a few piece parts have to be assembled.

If it is not wanted to use a different and large plastic member consisting of stop member and supporting ring of the crank wheel for different pendulum angles of the output shaft, the stop member has preferably to be manufactured independently of the supporting ring, so that only the stop member has to be adapted to the other pendulum angle. However the supporting ring is suitably used for holding the stop member, when a holding member extending as far as to the stop member and being telescoped with the stop member is formed onto it.

BRIEF DESCRIPTION OF THE DRAWINGS

Several embodiments of the drive unit according to the invention are shown in the accompanying drawings. By way of the Figures of these drawings the invention will be described below in detail. The Figures show.

DETAILED DESCRIPTION OF THE ALTERNATIVE EMBODIMENTS

Figure 1:
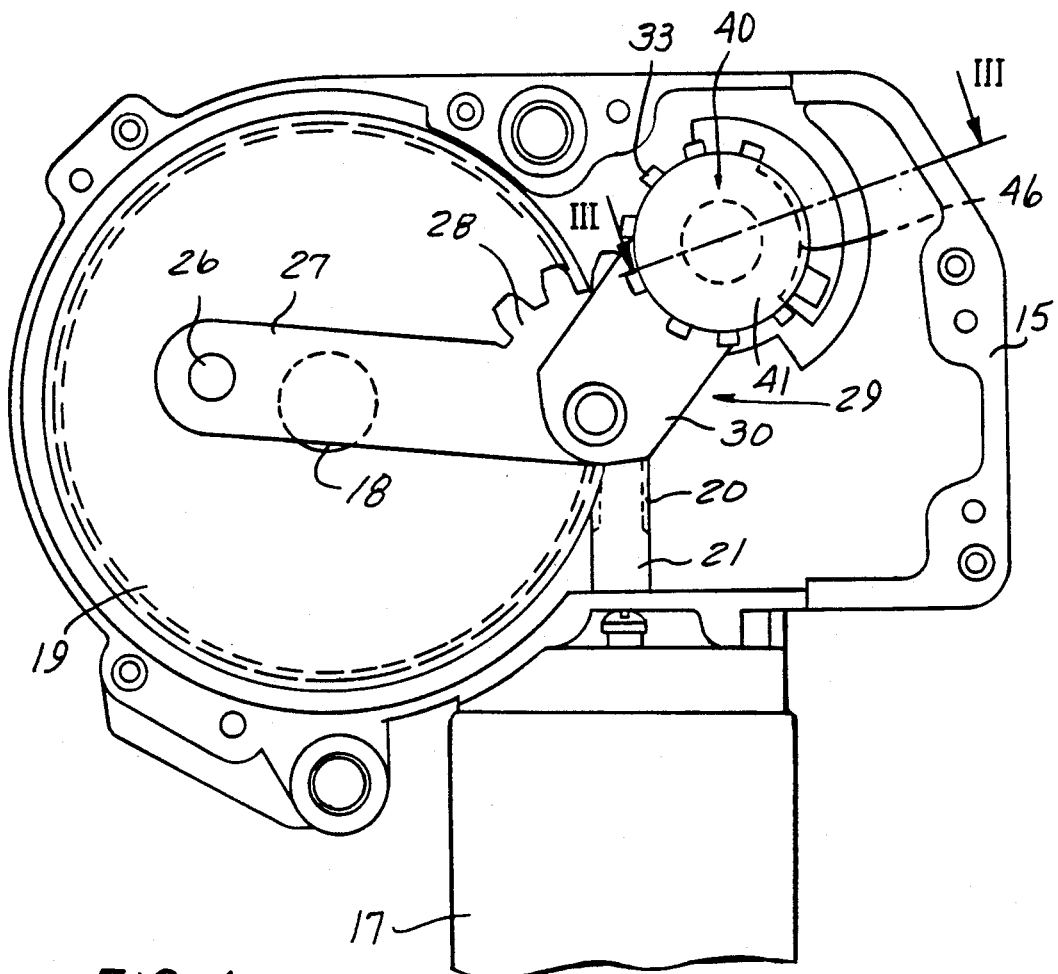
FIG. 1, in axial direction of the output shaft a view into the open gear housing of a first embodiment receiving a pendulum type gearing, in which the stop member is pushed upon the end of the output shaft.
Figure 2:
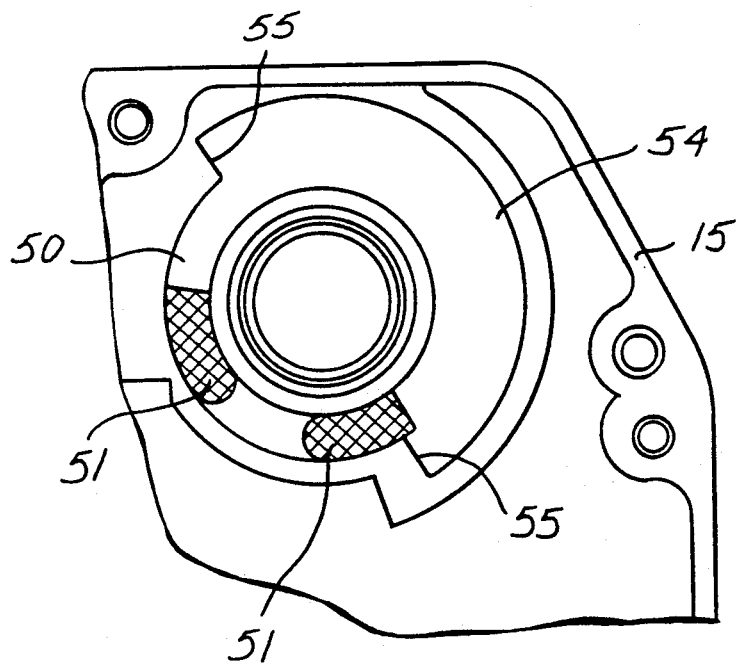
FIG. 2, in axial direction of the output shaft a view into the open gear housing according to FIG. 1, however with omitted gearing members.
Figure 3:
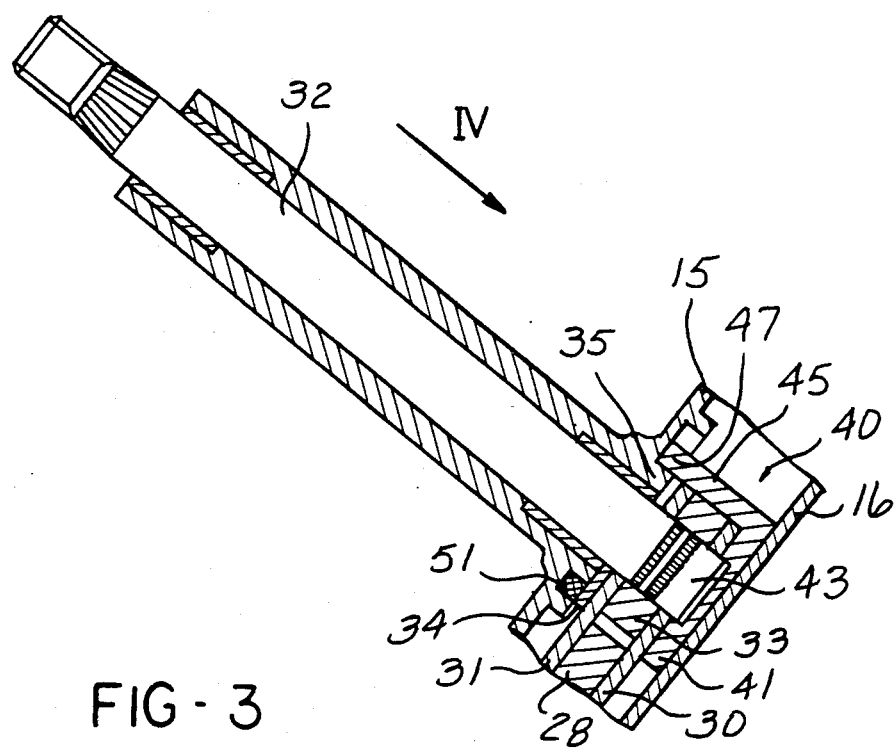
FIG. 3, a section taken on the line III—III of FIG. 1.

In the drive unit shown in FIGS. 1 to 3 for a windshield wiper on a motor vehicle, a pendulum-type gear is accommodated in a cup-shaped gear housing 15 which is closed by a cover 16 and flanged onto the housing 17 of an electric motor.

A stud bolt 18 is pressed into the gear housing 15, on which stud bolt a worm wheel 19 is rotatably mounted which in known manner is driven by a worm 20 being part of the rotor shaft 21 of the electric motor. A bolt 26 is eccentrically and rotatably mounted on the worm wheel 19, on which bolt a push rod 27 is fixed. The portion of the bolt 26 which protrudes over the worm wheel can be regarded as crank pin of a crank the length of which corresponds to the spacing of the bolt 26 from the axis of the stud bolt 18. The push rod 27 is developed as a toothed segment 28 at its end not facing the bolt 26 and is swivellably articulated centrically to the toothed segment on a rocker altogether designated 29. The rocker consists of two levers 30 and 31 spaced from each other and rotatably mounted on an output shaft 32 at both sides of a pinion 33 mounted on the output shaft 32 in a manner protected against twisting and which levers also form a frame for the toothed segment 28 on the push rod 27. The toothed segment 28 and the pinion 33 which is also only a toothed segment are held in gear with each other. On its side not facing the pinion 33 the lever 31 is supported on a bearing eye 35 for the output shaft 32 via a buffer disc 34, which bearing eye is integrally formed with the gear housing 10 and projects into the housing interior. On its side not facing the pinion 33 the lever 30 is supported on the cover 16 by means of a buffer disc, too. Thus in the area of the output shaft 32 the levers 30 and 31 are on both sides axially supported and therefore cannot tilt. The axial position of the pinion 33 and of the output shaft 32 is also determined through the levers.

During operation, the worm wheel 19 is driven in a particular direction of rotation by the electric motor via the worm 20 and takes along the bolt 26, which thus circles about the axis of the stud bolt 18. The push rod has to follow the motion of the bolt 26 and carry out a to-and-fro movement to which a swivelling motion is superimposed. The movement of the push rod 27 is transformed into a pendulum-type rotation of the output shaft 32 via the toothed segment 28 and the pinion 33. Thereby the reversing positions of the output shaft are to be retained without changes during operation. In the same way the rest position of the output shaft, which in the embodiments looked at is identical with a reversing position, is also to be reached very exactly.

Therefore measures are provided by which the influence of the play existing between the various gearing members in the reversing positions and the rest position of the output shaft is to be eliminated. In fact the pendulum-type motion of the output shaft is limited by stops in the reversing positions.

Figure 4:
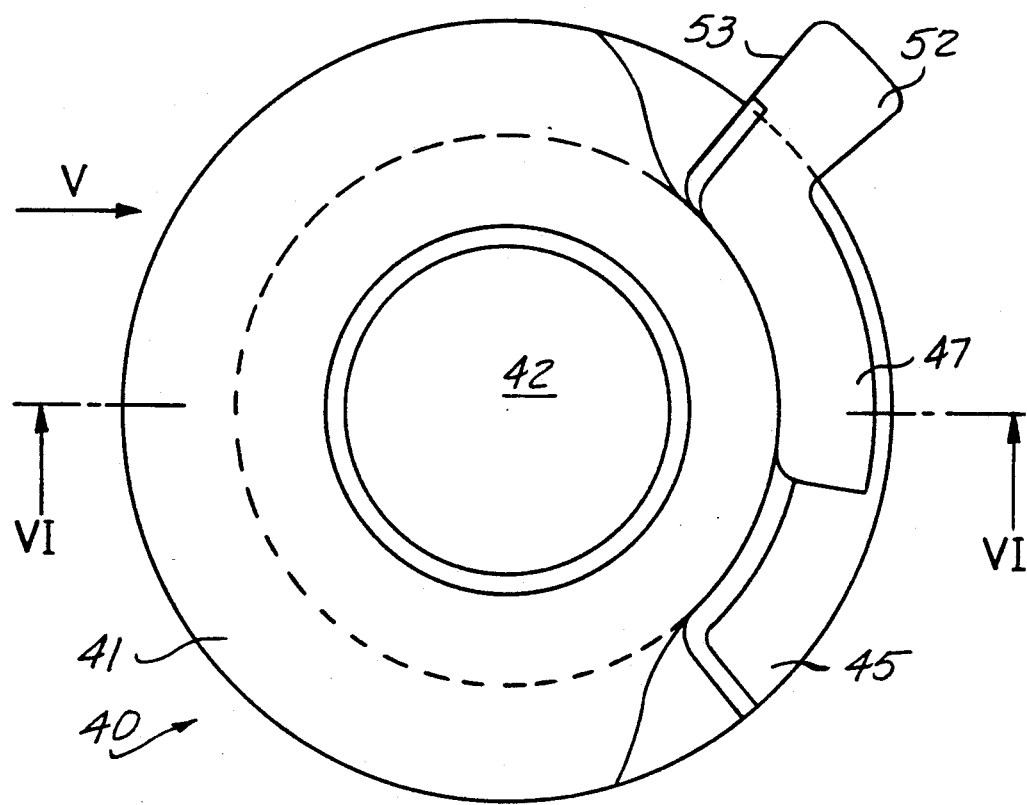
FIG. 4, a view of the stop member according to FIGS. 1 and 3 in the direction of arrow IV of FIG. 3.
Figure 5:
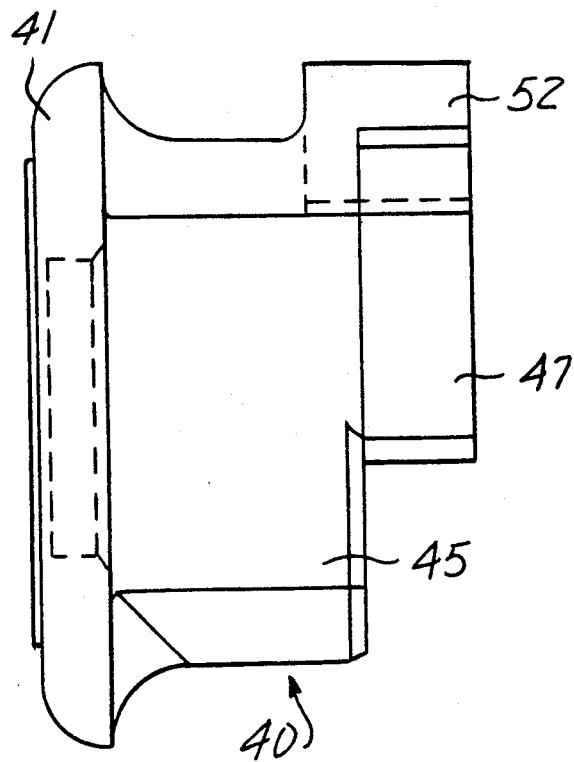
FIG. 5, a view of the stop member in the direction of arrow V of FIG. 4.
Figure 6:
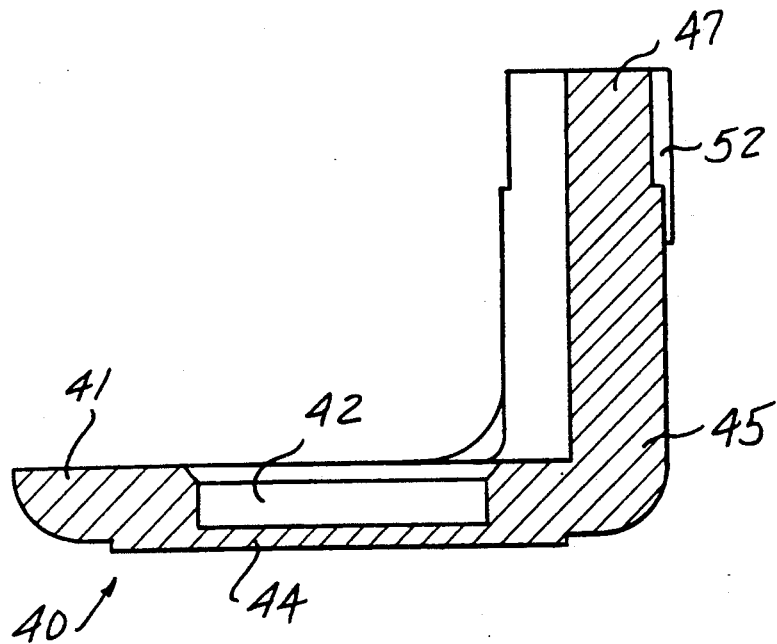
FIG. 6, a section taken on the line VI—VI of FIG. 4.

At first a stop member 40 is provided whose position in the gear housing can be seen from FIGS. 1 and 3 and which is shown in detail in FIGS. 4 to 6. The stop member 40 comprises a ring-shaped portion 41, which is pushed onto the end 43 of the output shaft 32 protruding over the pinion 33 and the lever 30 of the rocker 29 by means of a centric bore 42. Thereby the stop member 40, which is swivellable with the pinon 33, is reliably held in its predetermined position and well guided, when it is swivelled. The ring-shaped portion 41 is with regard to its thickness adapted to the spacing between the lever 30 and the cover 16 of the gear housing and simultaneously serves as a buffer disc via which the lever 30 is axially supported on the cover 16. Above the end 43 of the output shaft 32 the bore 42 is covered by a bottom 44, which in the proper axial position of the output shaft 32 has a spacing from the latter by which however the output shaft 32 is prevented from directly running against the cover 16 when it is axially displaced by extreme outside forces.

At the outer rim in a direction towards the pinion 33, a carrier 45 projects from the ring-shaped portion 41 of the stop member 40, the arc length of which carrier amounts to approximately 100 degrees and by means of which the stop member 40 engages axially in a tooth-free recess 46 on the circumference of the pinion 33. This recess 46 on the circumference of the pinion 33 can be made by punching in the same work step in which the teeth of the pinion are formed. The arc length of the recess 46 in the pinon 33 and the arc length of the carrier 45 are adapted to each other in such a way that the play is so little that on the one hand the stop member 40 can be easily mounted, but on the other hand in the swivelling direction pinion 33 and stop member 40 are coupled with each other practically without dead travel.

A stop 47 protrudes from the carrier 45 in the same direction as the carrier from the ring-shaped portion 41, the arc length of which stop is considerably smaller than that of the carrier 45. Looked at in the circumferential direction the center of the stop 47 is also set off relative to the center of the carrier 45. However it is not set off so much, that in the circumferential direction the stop 47 protrudes over the carrier 45, so that, when the stop member 40 is made of plastic material, the stop 47 can be simply removed from the mold.

When the stop member 40 is swivelled by the pinon 33, the stop 47 moves in a circular groove 50 provided in the bottom of the gear housing 15. Rubber segments 51 are inserted in the groove, which rubber segments are positioned in front of the ends of the groove 50 and are secured in the groove by means of the buffer disc 34, which in the moving range of the stop 47 is formed in such a way that it does not impede the motion of the latter. So for example the outer contour of the buffer disc 34 can be radially set back in the moving range of the stop 47. When carrier 45 and stop 47 are set off relative to each other it is possible to find an adequate position for the rubber segments in dependence on the conditions existing in the housing 15.

During operation the stop 47 of the stop member 40 is moved to and fro in the groove 50 which the same angular speed as the output shaft 32. If the output shaft and a windshield wiper carried by it reach a reversing position, the stop 47 abuts on one of the rubber segments 51 in the groove 50, so that the entire unavoidable play in the gearing is brought to the opposite side of the preceding swivelling direction and cannot affect the reversing position of the output shaft of a windshield wiper. Because of the rubber segments the striking noses are very low. The rubber segments 51 form elastically flexible counterstops fixed to the housing for the stop 47 on the stop member 40.

Approximately at the level of the stop 47 a second stop 52 is formed onto the stop member 40, which stop protrudes radially over the ring-shaped portion 41 and thus also over the carrier 45 and stop 47 positioned within the circumference of the portion, in the circumferential direction extends over approximately 15 degrees and its center is so far set off relative to the center of the carrier 45 in the same direction as the center of the stop 47 that a lateral surface 53 pointing into the circumferential direction is positioned in the same axial plane as a lateral surface of the carrier 45.

During operation the second stop 52 of the stop member 40 moves outside of the stop 47 in a widened area 54 of the groove 50 of the housing 15. The shoulders on the passages between the wider portion 54 of the groove and the narrow portions form rigid counterstops 55 fixed to the housing for the stop 52 of the stop member 40. By taking into consideration the lengths of the stops 47 and 52 the position of the counterstops is adapted to the position of the rubber segments 51 in such a way that during normal operation the stop 52 does not abut on the counterstops 55. If, however, it is attempted to turn the output shaft from outside by applying huge forces, the rubber segments 51 are only pressed together so far that the stop 52 abuts on one of the counterstops 55. The material of the rubber segments 51 is thereby prevented from being strained too much and the gearing members are prevented from being damaged.

Figure 7:
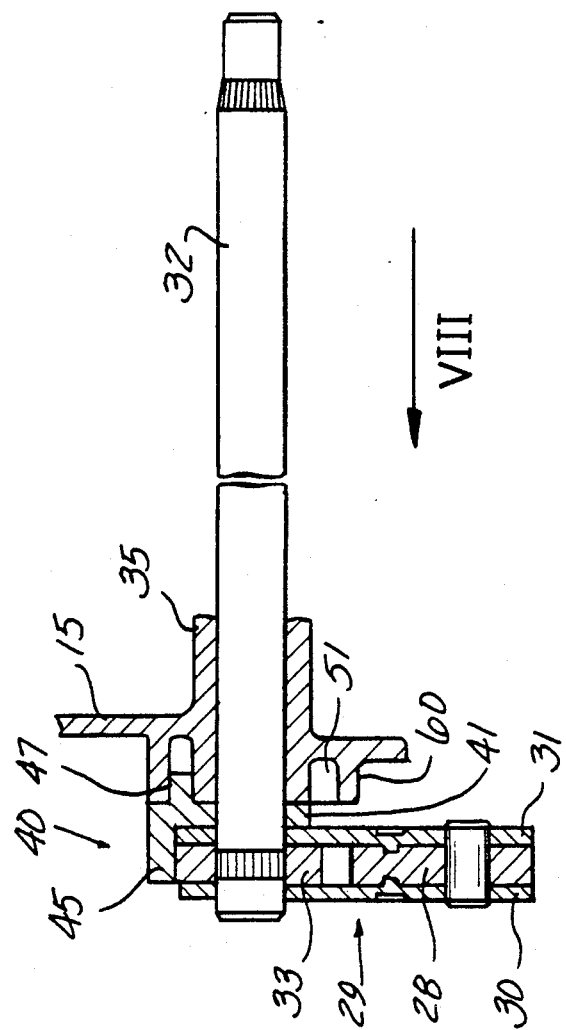
FIG. 7, a section corresponding to that of FIG. 3 through a second embodiment, in which the ring-shaped portion of the stop member is positioned on that side of the pinion on which the output shaft comes out of the gear housing.
Figure 8:
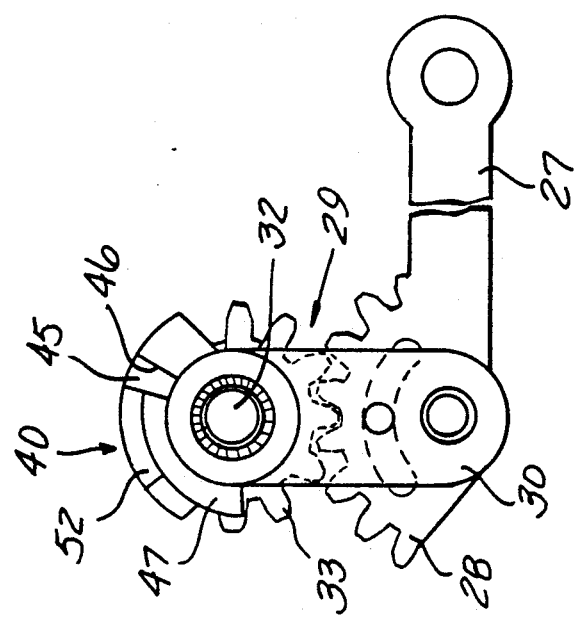
FIG. 8, a view of the embodiment in the direction of arrow VIII of FIG. 7, however with omitted gear housing.

The embodiment according to FIGS. 7 and 8 has a gearing of the same principle as the embodiment according to FIGS. 1 to 6. However in FIGS. 7 and 8 only the push rod 27 with the toothed segment 28, the rocker 29 with the two levers 30 and 31, the pinion 33 and the output shaft 32 are drawn. In FIG. 7 a part of the gear housing 15 with a bearing eye 35 for the output shaft 32 can also be recognized.

However in contrast to the embodiment according to FIGS. 1 to 6 the ring-shaped portion 41 of the stop member 40 is now positioned at that side of the pinion 33 on which the output shaft 32 comes out of the gear housing 15. The ring-shaped portion 41 as a buffer disc lies between the lever 31 of the rocker 29 and the gear housing 15. A carrier 45 of the stop member 40 axially projecting from the ring-shaped portion in the direction of the pinion 33 engages to a far-reaching extent free from play in a recess 46 on the circumference of the pinion 33. In the opposite direction a stop 47 extends from the ring-shaped portion 41, which stop co-operates with rubber segments 51 inserted in the gear housing 15 used as counterstops.

Figure 9:
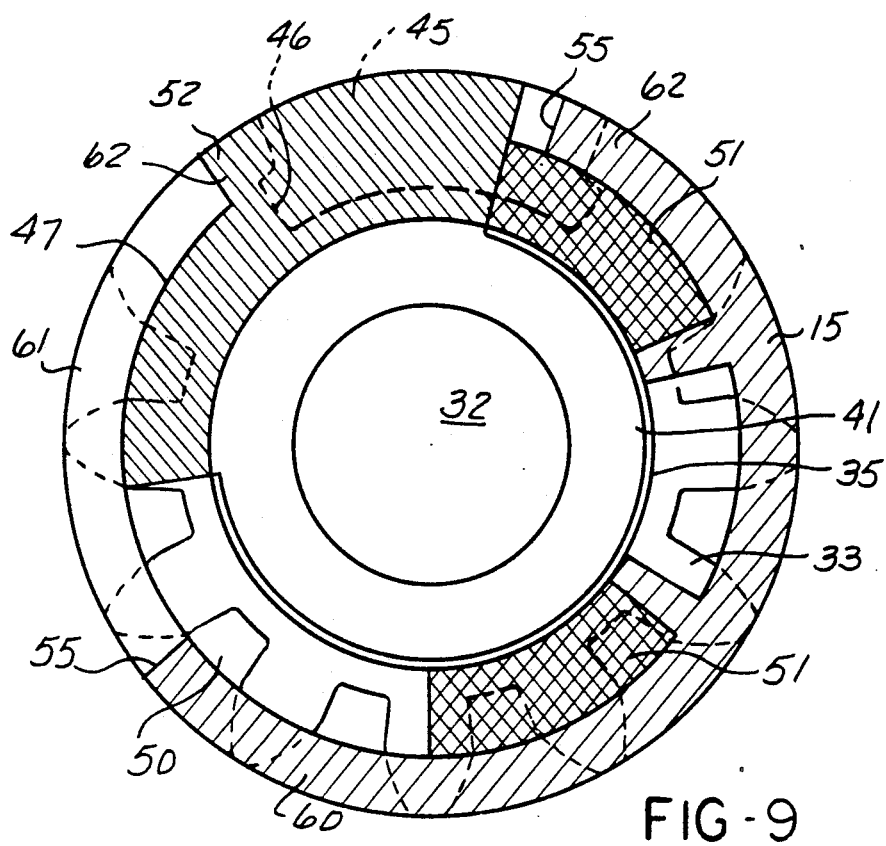
FIG. 9, a schematic sketch of the second embodiment at an enlarged scale.

In the schematic sketch according to FIG. 9 the positions or the rubber segments 51 is the circumferential direction around the bearing eye 35 of the housing 15 may be well recognized. The stop 47 rests against one rubber segment 51. Its arc length amounts to about 110 degrees, while the rubber segments 51 have a distance from each other of about 195 degrees. Thus the pendulum angle of the output shaft 32 is intended to amount to about 85 degrees.

The stop 47 moves in a groove 50 which is inside formed by the bearing eye 35 of the housing 15 and outside by an additional cylindric wall 60 of the housing 15. Within a particular angular range the outer wall 60 is made lower at a particular amount, so that a cut 61 has come into existence whose limitations form rigid counterstops 55 for a second stop 52 of the stop member 40. This second stop lies radially outside the first stop 47, however has an axially lower height. The lengths of the stops 47 and 52 as well as the positions of the counterstops 51 and 55 are selected in such a way that during normal operation only the stop 47 abuts on the counterstops 51. The stop 52 and its counterstops 55 become only effective, if it is attempted to turn the output shaft from outside. From FIG. 9 can be clearly seen that also the second stop 52 of the stop member 40 is still positioned within the tip circle of the pinion 33. Thus the stop member 40 does not reach radially beyond the pinion 33.

In FIG. 9 the contour of the recess 46 in the pinion 33 is shown by broken lines, which recess receives the carrier 45 of the stop member 40. It can be seen that the pinon 33 with a spacing from the radially inner limitation surface of the recess 46 in the circumferential direction projects into the recesses 46 by means of the two projections 62. The cross-section of the carrier 45 on the stop member 40 corresponds to the cross-section of the recess 46. Thus, looked at radially, the carrier engages behind the two projections 62 of the pinon 33 and is thereby in the radial direction directly secured to the pinion 33.

In FIG. 9 can in particular be clearly seen, however it can also be seen from FIG. 8, that the centers of the stops 47 and 52 are set off relative to the center of the carrier 45 of the stop member 40 in the circumferential direction. The stops 47 and 52 on the one hand and the carrier 45 on the other hand project even in the circumferential direction beyond the respective other part. However in difference to the stop member 40, in which the stops and the carrier are positioned at the same side of the ring-shaped portion 41, the stop member according to FIGS. 7 to 9 can still be axially removed from the mold.

On grounds of stability it is in itself not necessary that in the circumferential direction the stop 47 is in the circumferential direction as long as in the embodiment according to FIGS. 7 to 9 and thus the rubber segments 51 are spaced so far from each other as is shown in the drawing. The selected arrangement of the rubber segments 51 has however the advantage that with a larger pendulum angle of the output shaft 32 only the stop member 40 has to the exchanged against another stop member with in circumferential direction shorter stops 47 and 52 without any changes of the housing. A change stop member 40 can relatively easily be made, whereas the housing 15 is generally a complicated part which has to be the same, if possible, for several embodiments of drive units.

In the two embodiments described until now the stop member 40 may be swivelled by the pinion 33 together with its ring-shaped portion 41 pushed on the output shaft 32 and serving as buffer disc. In contrast thereto the embodiment according to FIG. 10 includes a stop member 40, which occupies a firm position in the gear housing 15, is however also pushed upon the output shaft 32 by means of a ring-shaped portion 41 and thus experience additional hold. The ring-shaped portion 41 of the stop member according to FIG. 10 can also serve as stop disc for one of the levers 30 and 31 of the rocker 29. The stop member 40 has two arms 70, which are elastic and form counterstops fixed to the housing for the toothed segment used as pinion 33. A rigid stop 71 each follows the elastically flexible arms 70, on which stop the respective arm abuts after a defined travel. Thereby a too heavy strain on the arms 70 is to be avoided, when it is attempted to turn the output shaft 32 from outside.

In order to provide that the arms 70 are not too flexible, they are strenghten by a metallic leaf spring 72, which is either directly injection-molded in the plastic material of the stop member 40 or can later on be inserted in a groove of the stop member 40.

Figure 10:
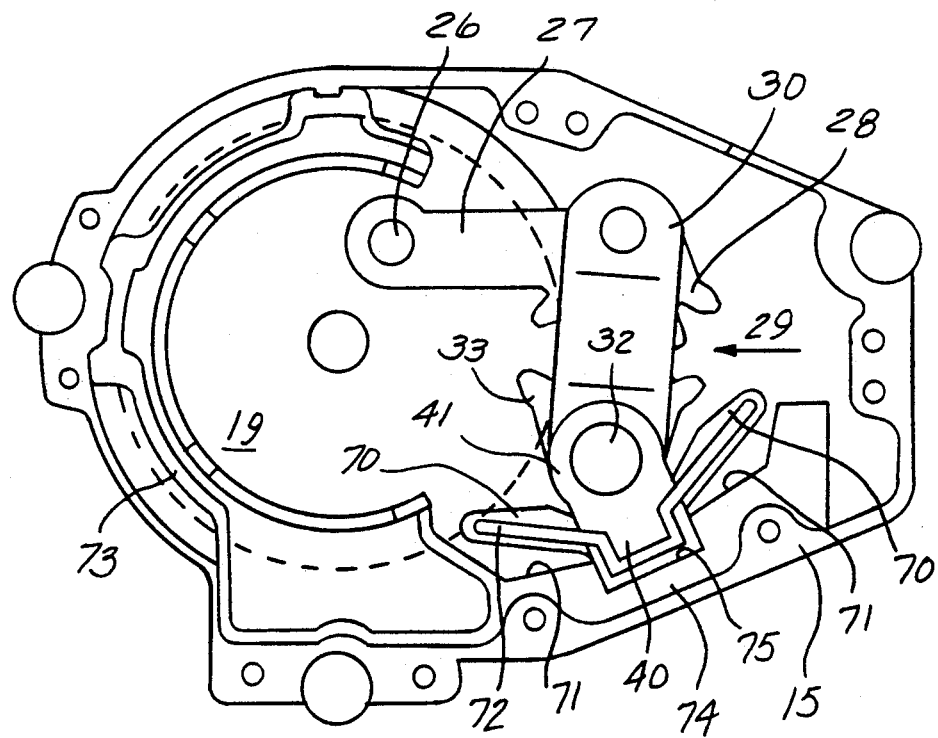
FIG. 10, in the axial direction of the output shaft a view into the open gear housing of a third embodiment, in which the stop member comprises the stops fixed to the housing.

In FIG. 10 a supporting ring 73 for the worm wheel 19 can furthermore be recognized, onto which ring a holding member 74 extending as far as to the stop member 40 is formed. On this holding member 74 the rigid stop 71 are positioned. In the shown version the stop member 40 is pushed into a recess 75 of the holding member 74 and it is thus protected against twisting. Consequently only different stop members 40 are used for different pendulum angles of the output shaft 32.

In particular if huge number of pieces are needed the supporting ring 73 with the holding member 74 and the stop member 40 will be made in one piece from plastic material.

What is claimed is:

1. A drive unit for a windshield wiper system on a motor vehicle comprising:
   a drive motor;
   a gear housing;
   gearing disposed within said housing including an output shaft driven in pendulum fashion, a pinion disposed on said output shaft for rotation therewith; and
   a stop member separate from said pinion, said stop member including a ring-shaped portion disposed concentrically with said shaft supportively abutting a portion of said housing and operative to establish rotational limits of travel of the output shaft, wherein the ring-shaped portion of the stop member serves as a buffer disc for axially supporting the pinion on the gear housing.

2. A drive unit for a windshield wiper system on a motor vehicle comprising:
   a drive motor;
   a gear housing;
   gearing disposed within said housing including an output shaft driven in pendulum fashion, a pinion disposed on said output shaft for rotation therewith; and
   a stop member separate from said pinion, said stop member including a ring-shaped portion disposed concentrically with said shaft supportively abutting a portion of said housing and operative to establish rotational limits of travel of the output shaft, wherein at one side of the pinion the output shaft comes out of the gear housing and wherein the ring-shaped portion of the stop member is pushed onto the end of the output shaft protruding at the other end of the pinion.

3. A drive unit according to claim 2, wherein the ring-shaped portion of the stop member is closed above the end of the output shaft.

4. A drive unit for a windshield wiper system on a motor vehicle comprising:
   a drive motor;
   a gear housing;
   gearing disposed within said housing including an output shaft driven in pendulum fashion, a pinion disposed on said output shaft for rotation therewith; and
   a stop member separate from said pinion, said stop member including a ring-shaped portion disposed concentrically with said shaft supportively abutting a portion of said housing and operative to establish rotational limits of travel of the output shaft, wherein the ring-shaped portion of the stop member is disposed on that side of the pinion on which the output shaft comes out of the gear housing.

5. A drive unit for a windshield wiper system on a motor vehicle comprising:
   a drive motor;
   a gear housing;
   gearing disposed within said housing including an output shaft driven in pendulum fashion, a pinion disposed on said output shaft for rotation therewith; and a stop member separate from said pinion, said stop member including a ring-shaped portion disposed concentrically with said shaft supportively abutting a portion of said housing and operative to establish rotational limits of travel of the output shaft, wherein the stop member may be swivelled about the axis of the output shaft by the pinion and by means of a stop cooperates with at least one counterstop fixed on the housing, wherein the pinion has a circumferential recess into which recess the stop member engages radially by means of a carrier.

6. A drive unit according to claim 5, wherein spaced from an inner limiting face of the recess, the pinion, in the circumferential direction, protrudes into the recess with at least one projection and the carrier on the stop member grips behind the projection.

7. A drive unit for a windshield wiper system on a motor vehicle comprising:
a drive motor;
a gear housing;
gearing disposed within said housing including an output shaft driven in pendulum fashion, a pinion disposed on said output shaft for rotation therewith; and
a stop member separate from said pinion, said stop member including a ring-shaped portion disposed concentrically with said shaft supportively abutting a portion of said housing and operative to establish rotational limits of travel of the output shaft, wherein the stop member may be swivelled about the axis of the output shaft by the pinion and by means of a stop cooperates with at least one counterstop fixed on the housing, wherein the swivelling direction the pinon and the stop member are coupled with each other with substantially no dead travel.

8. A drive unit for a windshield wiper system on a motor vehicle comprising:
a drive motor;
a gear housing;
gearing disposed within said housing including an output shaft driven in pendulum fashion, a pinion disposed on said output shaft for rotation therewith; and
a stop member separate from said pinion, said stop member including a ring-shaped portion disposed concentrically with said shaft supportively abutting a portion of said housing and operative to establish rotational limits of travel of the output shaft, wherein the stop member may be swivelled about the axis of the output shaft by the pinion and by means of a stop cooperates with at least one counterstop fixed on the housing, wherein in the axial direction of the output shaft the stop of the stop member projects from the ring-shaped portion or from the carrier of the stop member.

9. A drive unit for a windshield wiper system on a motor vehicle comprising:
a drive motor;
a gear housing;
gearing disposed within said housing including an output shaft driven in pendulum fashion, a pinion disposed on said output shaft for rotation therewith; and a stop member separate from said pinion, said stop member including a ring-shaped portion disposed concentrically with said shaft supportively abutting a portion of said housing and operative to establish rotational limits of travel of the output shaft, wherein the stop member may be swivelled about the axis of the output shaft by the pinion and by means of a stop cooperates with at least one counterstop fixed on the housing, wherein, looking in the circumferential direction of the pinion, the center of a carrier and the center of the stop of the stop member are set off relative to each other.

10. A drive unit for a windshield wiper system on a motor vehicle comprising:
a drive motor;
a gear housing;
gearing disposed within said housing including an output shaft driven in pendulum fashion, a pinion disposed on said output shaft for rotation therewith; and
a stop member separate from said pinion, said stop member including a ring-shaped portion disposed concentrically with said shaft supportively abutting a portion of said housing and operative to establish rotational limits of travel of the output shaft, wherein the stop member may be swivelled about the axis of the output shaft by the pinion and by means of a stop cooperates with at least one counterstop fixed on the housing, wherein the stop member to be swivelled by the pinion has the ring-shaped portion which on one side of the pinion is pushed onto the end of the output shaft, has a carrier formed onto the ring-shaped portion, which carrier engages in a recess on the circumference of the pinion, and includes a stop formed onto the carrier, which stop, at the other side of the pinion, co-operates with the at least one counterstop fixed to the housing.

11. A drive unit for a windshield wiper system on a motor vehicle comprising:
a drive motor;
a gear housing;
gearing disposed within said housing including an output shaft driven in pendulum fashion, a pinion disposed on said output shaft for rotation therewith; and
a stop member separate from said pinion, said stop member including a ring-shaped portion disposed concentrically with said shaft supportively abutting a portion of said housing and operative to establish rotational limits of travel of the output shaft, wherein the stop member may be swivelled about the axis of the output shaft by the pinion and by means of a stop cooperates with at least one counterstop fixed on the housing, wherein the stop member to be swivelled by the pinion has the ring-shaped portion located on that side of the pinion on which the gear housing has at least one counterstop, a carrier formed onto the ring-shaped portion, which carrier extends axially towards the pinion away from the ring-shaped portion, a stop formed onto the ring-shaped portion which from the side of the ring-shaped portion not facing the pinion extends anally away from the former.

12. A drive unit for a windshield wiper system on a motor vehicle comprising:
a drive motor;
a gear housing;

gearing disposed within said housing including an output shaft driven in pendulum fashion, a pinion disposed on said output shaft for rotation therewith; and a stop member separate from said pinion, said stop member including a ring-shaped portion disposed concentrically with said shaft supportively abutting a portion of said housing and operative to establish rotational limits of travel of the output shaft, wherein the stop member comprises a first stop having at least one elastically flexible counterstop fixed to the housing and a second stop cooperating with at least one rigid counterstop fixed to the housing and that the spacing between first stop and flexible counterstop is smaller than that between the second stop and the rigid counterstop.

13. A drive unit according to claim 12, wherein the second stop protrudes radially over the first stop.

14. A drive unit according to claim 13, wherein the second stop is at least substantially positioned within the tip circle of the pinion.

15. A drive unit for a windshield wiper system on a motor vehicle comprising:

a drive motor;

a gear housing;

gearing disposed within said housing including an output shaft driven in pendulum fashion, a pinion disposed on said output shaft for rotation therewith; and a stop member separate from said pinion, said stop member including a ring-shaped portion disposed concentrically with said shaft supportively abutting a portion of said housing and operative to establish rotational limits of travel of the output shaft, wherein the stop member has a firm seat in the gear housing and that the ring-shaped portion of the stop member is made in one piece at least with one arm, which is elastically flexible and forms a counterstop fixed to the housing for a stop of the pinion.

16. A drive unit according to claim 15, wherein the elastically flexible arm is followed by a rigid stop against which the arm abuts after having carried out a particular travel.

17. A drive unit according to claim 15, wherein the stop member is made of plastic material and the elastically flexible arm is strengthened by a metallic leaf spring.

18. A drive unit according to claim 15, wherein the gearing comprises a crank wheel which is axially supported outside the crank radius by means of a ring, and wherein the ring and the stop member are made in one piece from plastic material.

19. A drive unit according to claim 15, wherein the gearing includes a pinion which is axially supported outside the crank radius by means of a ring, wherein a holding member formed onto the ring extends as far as to the stop member and wherein the stop member and the holding member of the ring are telescoped.

* * * * *